United States Patent [19]

Mende

[11] Patent Number: 5,642,191
[45] Date of Patent: Jun. 24, 1997

[54] MULTI-CHANNEL IMAGING SPECTROPHOTOMETER

[75] Inventor: Stephen B. Mende, Los Altos, Calif.

[73] Assignee: Lockheed Missiles & Space Company, Inc., Sunnyvale, Calif.

[21] Appl. No.: 504,682

[22] Filed: Jul. 20, 1995

[51] Int. Cl.$^6$ .................................. G01J 3/14; G01J 3/28
[52] U.S. Cl. .............................. 356/326; 356/416
[58] Field of Search .................................. 356/300, 326, 356/402, 416, 419; 250/226

[56] References Cited

U.S. PATENT DOCUMENTS

| | | | |
|---|---|---|---|
| 4,743,112 | 5/1988 | Burke | 356/326 |
| 5,024,530 | 6/1991 | Mende | 356/402 |

OTHER PUBLICATIONS

Mende et al., "Multi-Wavelength Imaging Photometer for the Topside Observation of Gravity Waves", *SPIE-The International Society for Optical Engineering*, Jul. 25-27, 1994, vol. 2266, pp. 434-450.

*Primary Examiner*—F. L. Evans
*Attorney, Agent, or Firm*—Fenwick & West LLP

[57] ABSTRACT

An spectrophotometer system (100) separately images rays of optical radiation in a plurality of wavelength bands from a distant object into a plurality of distinct wavelengths simultaneously and projects the separate images upon a detector (124). Each distinct wavelength is within a corresponding one of the plurality of wavelength bands. The apparatus includes a lens system comprising an objective lens (104), first and second field lenses (108, 116), a collimating lens (118), and a re-imaging lens (120) all disposed coaxially with respect to each other along an optic axis (110). The objective lens (104) and the first field lens (108) coact to cause rays of optical radiation emitted by the object to form an image at a first focal plane. An aperture (112) at the first focal plane passes rays of the optical radiation corresponding to a predetermined portion of the object. The second field lens (116) causes rays from the image at the first focal plane to form an image at a second focal plane. The collimating lens (118) causes rays entering the collimating lens (118) to be parallel leaving the collimating lens (118). The re-imaging lens (120) forms an image on the detector (124). A filter (114) between the first field lens (108) and the first focal plane passes rays of the optical radiation within the wavelength bands and suppresses optical radiation in wavelengths outside the wavelength bands. A prism system (122) is disposed coaxially along the optic axis near the second focal plane. A first prism (130) causes light in a first one of the plurality of wavelength bands to appear in a first location. A second prism (132) causes light in a second one of the plurality of wavelength bands to appear in a second location.

6 Claims, 3 Drawing Sheets

FIG_1
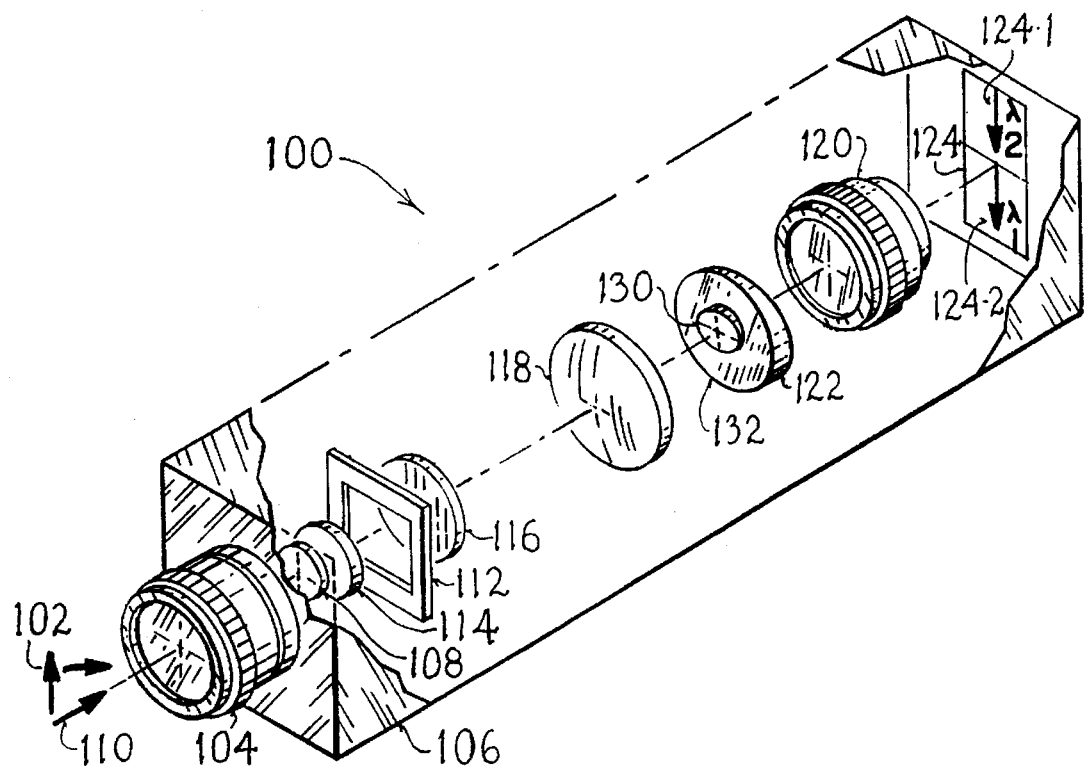
FIG_3
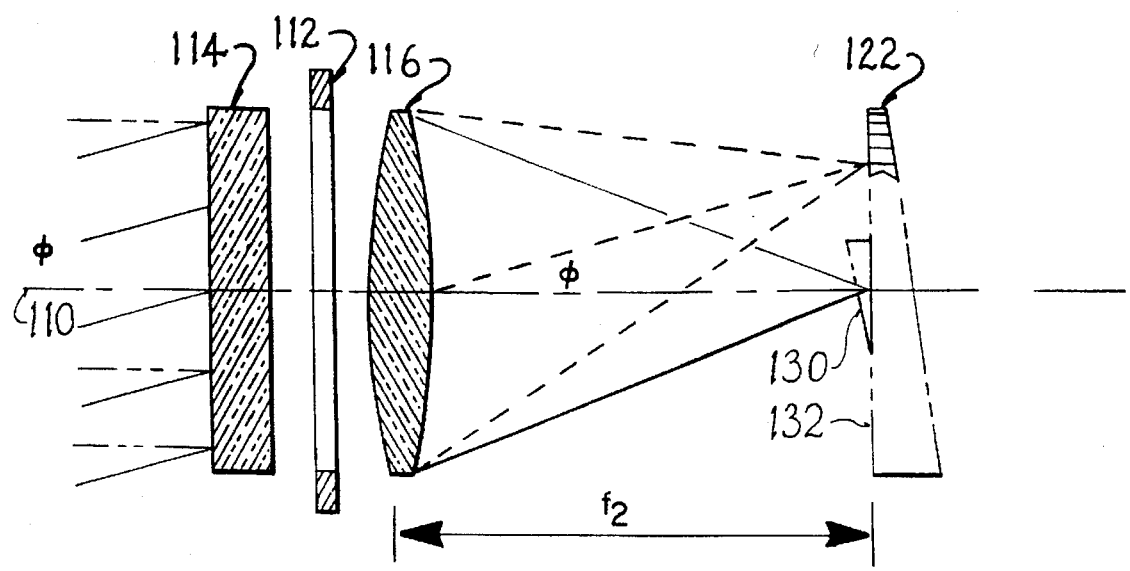

FIG_4
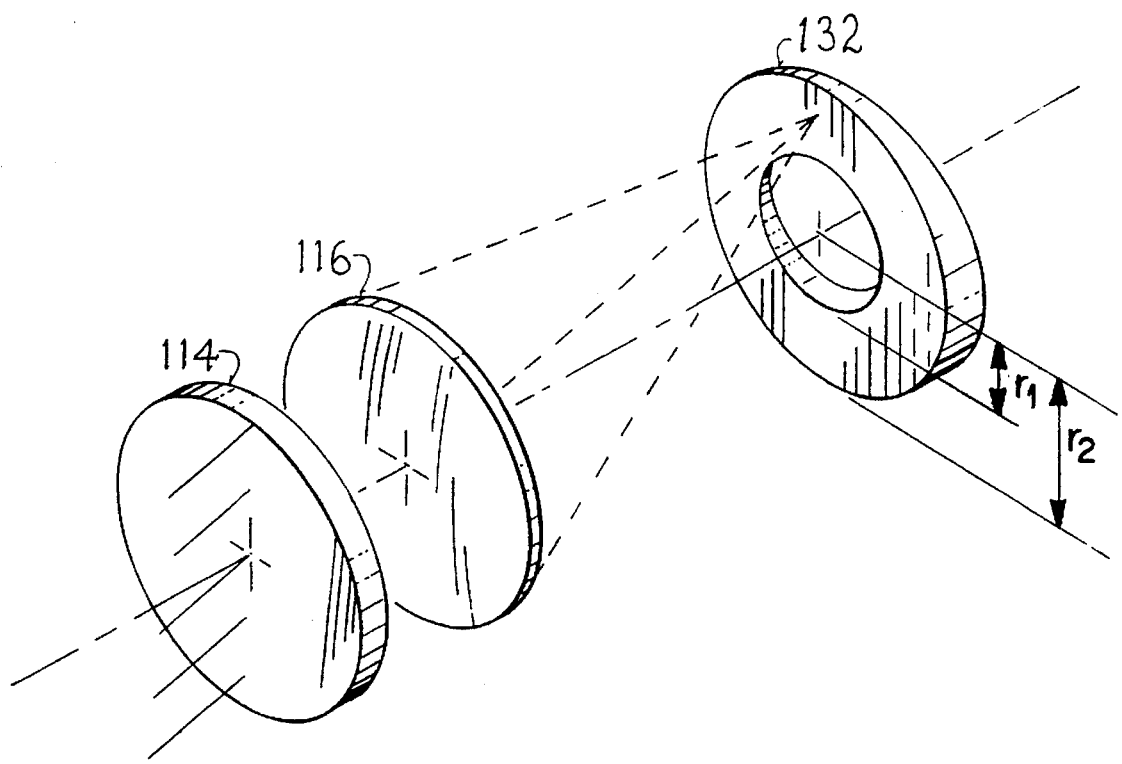
FIG_5
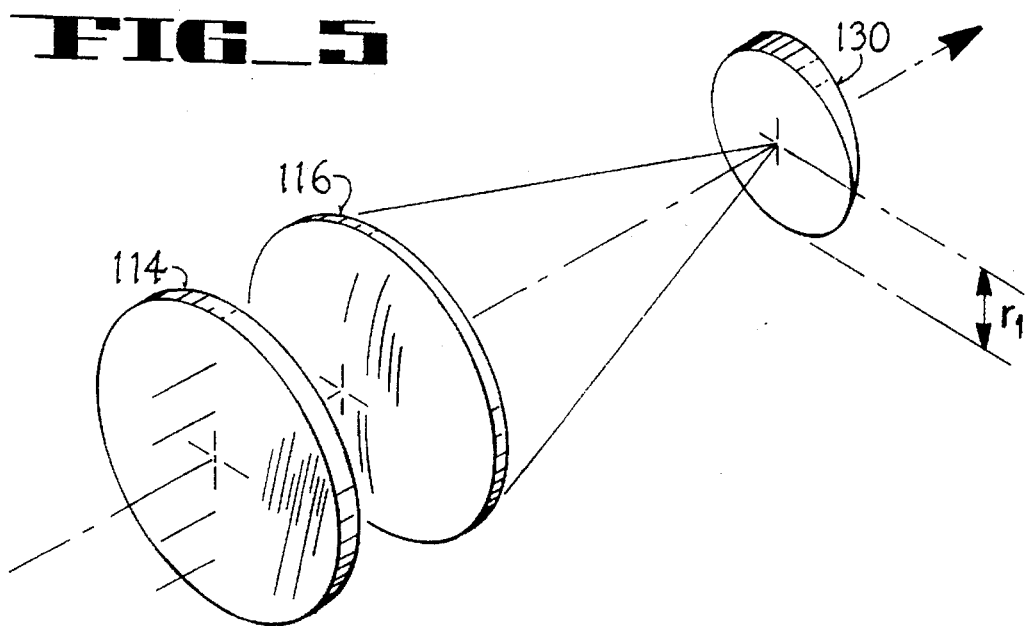

MULTI-CHANNEL IMAGING SPECTROPHOTOMETER

FIELD OF THE INVENTION

The invention relates generally to spectrophotometers, and more specifically to multi-channel imaging spectrophotometers.

BACKGROUND OF THE INVENTION

In remote sensing, there is a need for making gas velocity (wind) measurements of atmospheric gases by measuring the Doppler shift of individual spectral lines. Also in remote sensing, high spectral resolution is needed to measure the temperature of the gases either by looking at the width of a spectral line or by comparing the intensity of spectrally adjacent features. In studying the properties of gaseous emissions, such as astrophysical nebulosities, atmospheric reactions (aurora and airglow), laboratory gas discharges, and in performing process monitoring of reactive gases, the spectral profile of the emitted light provides various information about the source of the emissions. Because of various factors the velocities and temperatures are variable and the mapping of these variations is required. Conventionally this is accomplished by a single channel spectrophotometer or interferometer which is scanned across the field of view to map the variation of the velocity and temperature fields. This scanning is cumbersome and inefficient, usually taking a long time. During such scans the phenomena may change. It would be advantageous to image and to map the velocities and temperatures simultaneously over the entire field.

Simultaneous images in adjacent wavelength bands are also desired. It is customary to use several parallel bore-sighted imagers with a different filter in each and take data with an image detector, such as a charge coupled device (CCD), and compare the two images taken in different wavelengths. The imagers for this task are voluminous and heavy for use in platforms such as aircraft and satellites.

In many applications, it is desirable to have only one input optics and only one detector; and to separate the light after it goes through the input optics according to wavelength and produce images side by side on a single detector. A device to perform this task was described in U.S. Pat. No. 5,024,530 to Mende. The device in the Mende patent simultaneously images several wavelength bands from a single input optics provided that the wavelength bands are widely separated. It would be advantageous to have a device that images with a single imager in wavelength bands which are very close to one another. It would be advantageous to use this device to produce images in adjacent wavelength bands to detect neighboring spectral line components of molecular bands. This is an important technique in remote sensing of gas temperature.

SUMMARY OF THE INVENTION

In accordance with the present invention, an apparatus gathers light from a remote object and forms distinct images of the object simultaneously in different wavelengths side by side on a detector (124). The apparatus uses a narrow band interference filter and a prism system (122) comprising a central disk prism (130) and at least one annular prism (132) to produce distinct images in narrow adjacent wavelength bands that are separated from each other on the detector (124).

This apparatus images adjacent wavelength bands to measure the spatial profile of the image in several spectral bands and to obtain the temperature of gaseous substances in a remote sensing mode or multi-channel bore sighted imagers.

BRIEF DESCRIPTION OF THE DRAWINGS

FIG. 1 is a perspective diagram of a multi-channel imaging spectrophotometer.

FIG. 3 is a partial longitudinal cross-sectional view of the filter, aperture, field lens and prism of the spectrophotometer of FIG. 1 illustrating the interference property of light.

FIG. 4 is a perspective view of a filter, field lens, and annular prism of the spectrophotometer of FIG. 1

FIG. 5 is a perspective view of a filter, field lens, and disk prism of the spectrophotometer of FIG. 1.

DETAILED DESCRIPTION OF THE PREFERRED EMBODIMENTS

Figure 2:
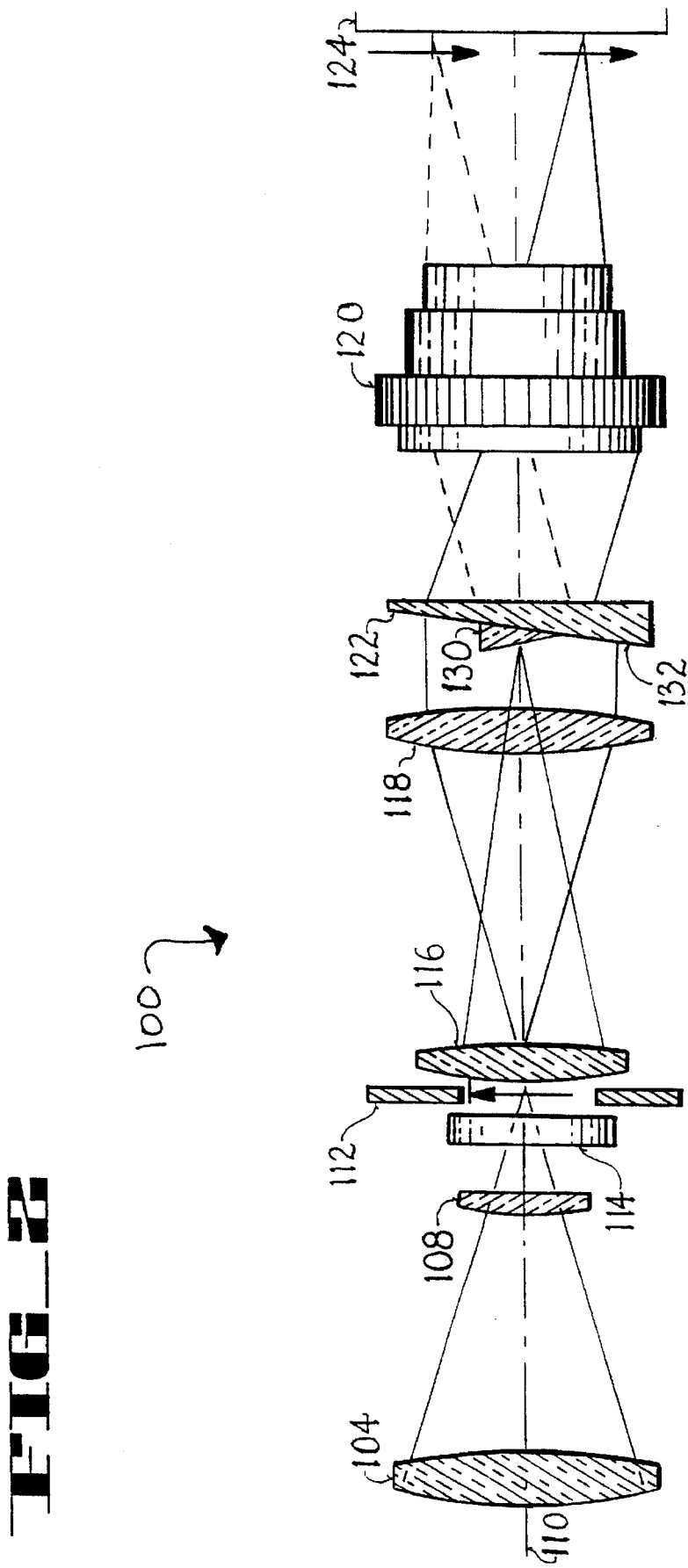
FIG. 2 is a longitudinal cross-sectional view of the spectrophotometer of FIG. 1.

Referring to FIGS. 1 and 2, there is shown a perspective view (partially broken away) and a longitudinal cross-sectional view, respectively, of a multi-channel imaging spectrophotometer 100. Light 102 from a remote object (not shown) passes through an objective lens 104 mounted in an opening of a housing 106, and through a first field lens 108 mounted along an optical axis 110 of the housing 106 to form an image in the plane of an aperture 112, positioned on the optical axis 110 at the focal length of the first field lens 108. The aperture 112 defines the field of view of the remote object. The aperture 112 preferably has a rectangular shape. The light 102 from the object has a plurality of wavelengths. A filter 114 between the first field lens 108 and the aperture 112 along the optical axis 110 passes wavelengths of the light 102 in specified wavelength bands and ideally suppresses all radiation outside the specified wavelength bands. The filter 114 is preferably a narrow band interference filter having reflective surfaces on opposite sides of a spacer. The filter 114 may be, for example, a thin film filter or a Fabry-Perot interferometer.

A second field lens 116, along the optical axis 110 on a side of the aperture 112 opposite that of the first field lens 108, in combination with the first field lens 108 directs the light through the aperture 112 and onto a collimating lens 118 and onto a reimaging lens 120. The rays of light from each point of the image are parallel after passing through the collimating lens 118. The collimating lens 118 ensures that a prism system 122 positioned at the focal length of the second field lens and located between the collimating lens 118 and the re-imaging lens 120 does not seriously interfere with the image formation by the re-imaging lens 120. The second field lens 116 and the filter 114 coact to form the rays of the light into annular rings that are dependent on the wavelength of the light as described below in conjunction with FIG. 3. The collimating lens 118 preferably is positioned close to the prism system 122 to reduce the interference with the wavelength dependent ring formation by the filter 114 and the second field lens 116.

The re-imaging lens 120 focuses images onto a photo detector 124 comprising a plurality of photo detector elements (not shown). The photo detector elements may be, for example, charge coupled devices (CCD).

Referring to FIG. 3, there is shown a partial longitudinal cross-sectional view illustrating the interference property of light by the filter 114 and the second field lens 116. For a thin film filter 114, the wavelength (λ) having the maximum transmission through the filter 114 is determined by the equation $$2\mu_s t \cos(\theta) = n\lambda \quad (1)$$

where $\mu_s$ is the refractive index of the spacer in the filter 114, t is the thickness of the spacer in the filter 114, $\theta$ is the angle at which the light is passing through the spacer in the filter 114, and n is an integer. For wavelengths other than $\lambda$ the light transmission is generally strongly attenuated. The second field lens 116 focuses the portion of the filtered light passing through the lens at an angle $\phi$ in a plurality of rings at the focal length of the lens. In other words, rays which pass through the filter 114 parallel to the optic axis 110 have a first wavelength while rays subtending a given cone angle to the optic axis 110 pass through the filter 114 at a second wavelength which is lower than the first wavelength. In this way, the narrow band interference limits the throughput (etendu) to narrow conical beams and the spectrophotometer uses these conical beams simultaneously without wasting light.

The first ring corresponding to wavelength $\lambda$ has a radius (r) calculated by the equation $$r = f_1 * \tan(\phi) \quad (2)$$

where $f_1$ is the focal length of the second field lens 116 and the angle $\phi$ is determined by the law of refraction from the equation $$\mu_s \sin(\phi) = \sin(\phi) \quad (3)$$

where $\mu_s$ and $\theta$ are defined above.

Referring back to FIGS. 1 and 2, the prism system 122 comprises a central disk prism 130 and one or more concentric annular prisms 132. For clarity, only one annular prism 132 is shown. The collimating lens 118 and the re-imaging lens 120 coact to re-image the aperture and the real image formed at the aperture onto the detector 124. Absent the prism system 122, there is one rectangular image at the detector centered on the optic axis 110. The prism system 122 separates the image. The disk prism 130 bends the light in a first direction, e.g., downward. The annular prism 132 bends the light in a second direction, e.g. upward. For a prism system 122 having two prisms, the photo detector 124 has an upper photo detector 124-1 and a lower photo detector 124-2. The re-imaging lens 120 places the light from the disk prism 130 onto the upper detector 124-1 and places the light from the annular prism 132 onto the lower detector 124-2. The upper detector 124-1 and the lower detector 124-2 preferably each have a shape similar to the shape of the aperture 112. Thus, two images are produced spatially separated side by side, distinct, and with each corresponding to different wavelength bands to provide spectral resolution. Each image provides spatial resolution for the corresponding wavelength band.

The disk prism 130 and the annular prisms 132 may be wedges or rotated to project the light in different directions. Each annular prism 132 produces a ray bundle that when focused by the re-imaging lens 120 generates a separate image on the detector 124. By sizing the aperture 112 and the focal lengths of the collimating lens 118 and the re-imaging lens 120, images are projected onto the detector 124 that are side by side and do not overlap.

The annular prisms 132 may have facets parallel to each other to combine the light flux into one image from different wavelength bands or from different orders at the same wavelength.

The light refracted by the prism 122 is at a deviation angle $\theta$ calculated by the equation $$\theta = \sin^{-1}(\mu_p \sin\alpha) - \alpha \quad (4)$$

where $\alpha$ is the wedge angle of the prism and $\mu_p$ is the refractive index of the prism. The image center is displaced a distance d calculated by the equation $$d = f_2 \tan\theta \quad (5)$$

where $f_2$ is the focal length of the re-imaging lens 120.

Conversely if the distances d are predefined for an spectrophotometer, the deviation angle $\theta$ and the wedge angle $\alpha$ may be calculated.

Referring to FIG. 4, there is shown a perspective view illustrating the filter 114, the second field lens 116, and one annular prism 132. For clarity, the collimating lens 118 is not shown. The annular prism 132 has an inner radius $r_1$ and an outer radius $r_2$. Light in a wavelength band between $\lambda_1$ and $\lambda_2$ impinges the annular prism 132. The wavelengths $\lambda_1$ and $\lambda_2$ are determined from the equation $$r_i = f_1/(1/(\mu^2(1-(\lambda_i/\lambda_0)^2)) - 1)^{1/2} \quad (6)$$

where $f_1$ and $\mu$ are defined above and $\lambda_i$ is the wavelength corresponding to radius $r_i$. $\lambda_0$ is the wavelength of a ray perpendicular to the filter 114. Light which is not in the band defined by $\lambda_1$ and $\lambda_2$ passes through the center hole of the annular prism 132, which may have a disk prism 130 as shown in FIG. 5 below or passes outside the outer radius of the annular prism.

Referring to FIG. 5, there is shown a perspective view illustrating the filter 114, the second field lens 116, and the disk prism 130. For clarity, the collimating lens 118 is not shown. The disk prism 130 has an outer radius $r_1$. The second field lens 116 focuses light in a wavelength band between $\lambda_0$ and $\lambda_1$ on the disk prism 130. The wavelength $\lambda_0$ is derived by the properties of the filter and it is the wavelength at which the filter 114 transmits light which is passing through it perpendicularly.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

I claim:

1. An apparatus for enabling a distant object that emits rays of optical radiation in a plurality of wavelength bands to be separately imaged upon a detector in a plurality of distinct wavelengths simultaneously, each distinct wavelength being within a corresponding one of the plurality of wavelength bands, the apparatus comprising:

a lens system comprising an objective lens, first and second field lenses, a collimating lens, and a re-imaging lens all disposed coaxially with respect to each other along an optic axis, the first field lens being positioned between the objective lens and the second field lens, the objective lens and the first field lens coact to cause rays of optical radiation emitted by the object to form an image at a first focal plane, the second field lens being positioned between the focal plane and the collimating lens to cause parallel rays from the image at the first focal plane to focus at a second focal plane, the collimating lens being positioned between the second field lens and the re-imaging lens to cause rays from each point of an image entering the collimating lens to be parallel leaving the collimating lens, the re-imaging lens being positioned to form an image on the detector;

a filter disposed between the first field lens and the first focal plane, said filter passing rays of the optical radiation within the wavelength bands and suppressing optical radiation in wavelengths outside the wavelength bands; and a prism system disposed coaxially along the optic axis near the second focal plane, the prism system comprising first and second prisms, the first prism causing light in a first one of the plurality of wavelength bands to refract to a first location, the second prism causing light in a second one of the plurality of wavelength bands to refract to a second location, the re-imaging lens forming a first distinct image from the refracted light from the first prism and forming a second distinct image from the refracted light from the second prism, the distinct images being spatially separated from each other on corresponding distinct portions of the detector.

2. The apparatus of claim 1 wherein the detector comprises first and second subdetectors positioned to receive the refracted light at the first and second locations, respectively.

3. The apparatus of claim 1 further comprising:

an aperture positioned at the first focal plane for passing rays of the optical radiation corresponding to a predetermined field of view of the object.

4. The apparatus of claim 1 wherein the first prism is a disk prism and the second prism is an annular prism concentric with the first prism.

5. The apparatus of claim 1 wherein the first prism is an annular prism and the second prism is an annular prism concentric with the first prism.

6. The apparatus of claim 1 wherein the filter is a narrow band interference filter.

* * * * *